3,300,366
PERFORATED SHEET MATERIAL
Day Krolik, Jr., 5965 Lahser Road,
Birmingham, Mich. 48010
Filed Mar. 19, 1964, Ser. No. 353,162
3 Claims. (Cl. 161—112)

This invention relates to sheet material and more specifically to an improved nonwoven fabric formed of organic polymeric material, and a method for making same.

In my United States patent application Serial No. 94,940, filed March 10, 1961, now Patent No. 3,137,611, there is disclosed and claimed a low-cost nonwoven fabric formed, for example, of an organic polymeric material such as polyethylene or the like and wherein the porosity is provided by bubbles which extend through the sheet material whereby the webbing which constitutes the side walls of the bubbles corresponds to the crossed interwoven strands of ordinary more expensive woven fabrics. Such nonwoven organic polymeric fabric can be manufactured at low cost as by an extrusion process and finds utility for the manufacture of inexpensive clothing, drapes, wall coverings, packaging, etc.

The present invention has as its principal object the provision of an improved nonwoven fabric having greater strength characteristics and improved decorative effect. The invention has a further object of the provision of a method for manufacturing high strength, decorative nonwoven fabric.

Briefly, the present invention comprehends a laminate of at least two sheets of material each having closely spaced elongated substantially parallel perforations therethrough over the entire surface thereof, the perforations in one of the sheets overlapping and extending at an angle, preferably at a right angle, to those in the other of the sheets whereby the laminate gives the appearance of a woven fabric. In the preferred embodiments of the invention each of the sheets is manufactured by extruding into sheet form an organic polymeric material with the elongated perforations therein being formed during the extrusion operation, and with the sheet being stretched during the extrusion operation whereby increased strength is imparted in the direction of the axis of the stretching. The two sheets so manufactured are then bonded to each other with the elongate perforations and therefore the axes of highest strength being oriented at right angles. Hence, the finished laminated material has excellent strength in the direction of both of its axes along with a highly decorative effect by way of the crossed elongated perforations which provide the appearance of a woven material.

Figure 1:
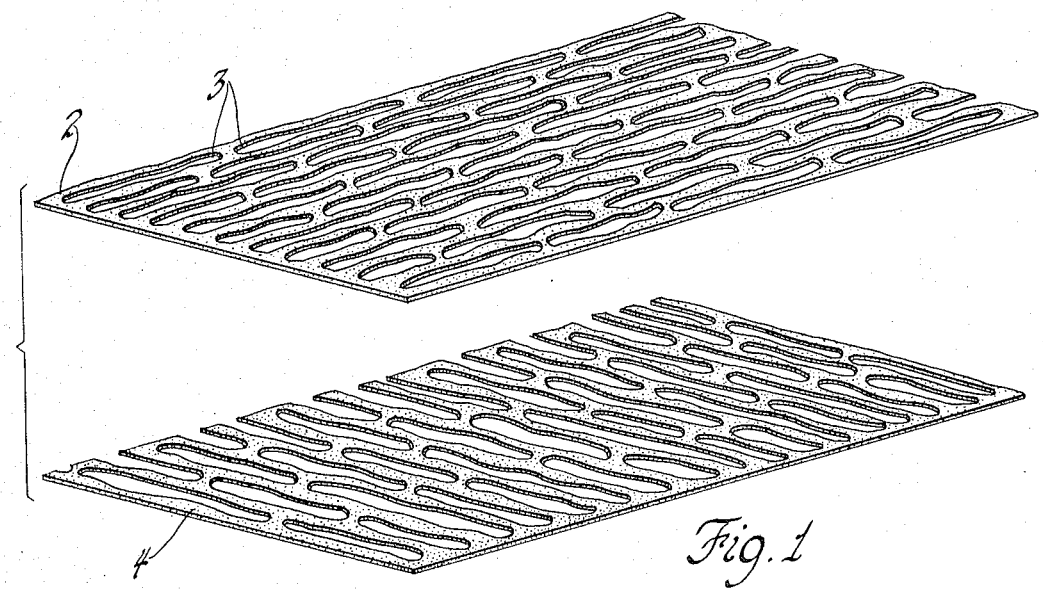
Figure 2:
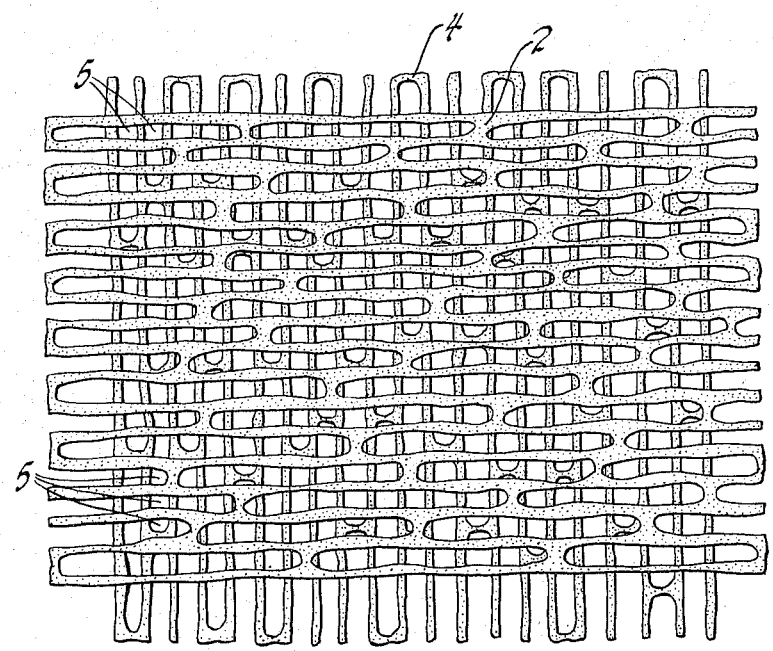

The above and other objects and features of the invention will appear more clearly from the following detailed description of a preferred embodiment thereof made with reference to the drawings in which:

FIGURE 1 is an exploded view of a preferred embodiment of the invention showing the relationship and orientation of the two sheets forming the laminate; and FIGURE 2 is a top view of a nonwoven fabric material made in accordance with the invention.

Referring now to FIGURE 1, reference numeral 2 designates an extruded sheet of polyethylene or the like having elongated perforations 3 therethrough, the elongated perforations being in a random arrangement over the entire surface of the sheet from one edge to the other thereof. Reference numeral 4 designates an identical sheet but with the longitudinal axes of the elongated perforations therein oriented at 90° to those in the sheet 2. When the two sheets are bonded together the resulting laminate has the appearance as shown in FIGURE 2, there being perforations 5 through the sheet over the entire surface thereof, each perforation constituting a point of overlap between the elongated perforations of the sheets 2 and 4.

The preferred method for making each of the sheets 2 and 4 is by the technique covered by my aforesaid pending patent application, the sheet being stretched during formation in an extrusion operation to thereby elongate the perforations. For example, the thermoplastic organic polymer, such as polyethylene, is heated to above its melting temperature and is subjected to a suitable blowing agent such as nitrogen gas to form bubbles in the molten polyethylene. Such molten polyethylene is then extruded through an extrusion die opening to form a sheet, the height of the extrusion die opening and hence the thickness of the sheet being slightly less than the diameter of the bubbles of nitrogen gas in the molten polyethylene. As the sheet is extruded, a pulling force is applied thereto to thereby cause stretching. Hence, as the material is extruded, the bubbles of nitrogen gas provide perforations through the sheet as it moves through the extrusion die, and the perforations so formed are immediately stretched to elongated form by way of the pulling force applied to the sheet. Because of the stretching, the resultant sheet has high directional strength along the longitudinal axis of the elongated perforations. After each sheet is so formed, one is turned at right angles to the other and pressure and heat applied, as by passing through heated rollers, to thereby bond the two sheets together to form the laminate.

If desired, one sheet can be manufactured as just described with the pulling force applied in the direction of extrusion, and the other sheet can be formed by applying the pulling force in a direction at right angles to the direction of extrusion whereby the longitudinal axes of the elongated openings and the axis of the greater strength will be in a direction at right angles to the longitudinal axis of the elongated sheet so formed. To provide the pulling force in a direction at 90° to the movement of the sheet as it is being extruded, the width of the extrusion opening and hence the width of the extruded sheet is made less than the desired width for the finished sheet and the pulling force is then applied transversely across the sheet, from edge to edge thereof as or just after it leaves the extrusion opening whereby the sheet is stretched to the width desired. With such technique, it is possible to manufacture the laminated material on a continuous basis. That is, one continuous elongated sheet as it proceeds from its extrusion and stretching operation has the elongated perforations therein extending longitudinally of the sheet, and the other sheet has its elongated openings transverse to the longitudinal axis of the sheet by reason of the transverse stretching. The two such sheets can be continuously moved face to face, one on top of the other, through heated pressure rollers whereby the one sheet is bonded to the other to form the laminate.

Particularly where the laminate is formed of only two sheets it will normally be desirable that they be bonded at a 90° angle between their perforations as described. However, particularly where more than two sheets are used for the laminate it may be desirable to use other angles between the perforations of the sheets; for example, where four sheets are used an angle of 45° between the perforations of adjacent sheets may be advantageous for optimum strength characteristics or the desired decorative effect.

Particularly where it is desired to manufacture a laminate with the elongated perforations in each sheet in precise predetermined relationship to each other, it will be advantageous to form each of the sheets by the method disclosed and covered in my United States patent application Serial No. 353,161 filed concurrently herewith.

Whereas the invention has been described with reference to the use of polyethylene as the polymeric material, it will be understood that any of a number of other materials may be used if desired, for example, any of those set forth in my aforesaid pending application Serial No. 94,940. Also, other processing techniques can be used to manufacture the laminate, if desired, and it will be manifest therefore that while the invention has been described in detail specifically with reference to certain preferred embodiments thereof, various changes and modifications may be made all within the full and intended scope of the claims which follow.

I claim:

1. A sheet comprising a laminate of at least two sheets of material each having closely spaced elongated substantially parallel perforations therethrough, the perforations in one of said sheets overlapping and extending at a substantial angle to the perforations in the other of said sheets.

2. A sheet comprising a laminate of at least two sheets of flexible polymeric material each having closely spaced elongated substantially parallel perforations therethrough and being stretched in the direction of said perforations to provide increased strength, the perforations in one of said sheets overlapping and extending at about a right angle to the perforations in the other of said sheets.

3. A nonwoven fabric comprising at least two extruded sheets of flexible organic polymeric material bonded together face to face, each of said sheets having closely spaced elongated substantially parallel perforations therethrough, the perforations in one of said sheets extending at about a right angle to the perforations in the other of said sheets.

References Cited by the Examiner

UNITED STATES PATENTS

| 712,064 | 10/1902 | Heath | 161—110 |
| 2,800,423 | 7/1957 | DeSwar | 161—112 |
| 2,955,064 | 10/1960 | Frohmader | 116—112 |
| 3,239,401 | 3/1966 | Beery | 161—58 |

EARL M. BERGERT, *Primary Examiner.*

DOUGLAS J. DRUMMOND, *Examiner.*